UNITED STATES PATENT OFFICE 2,483,845

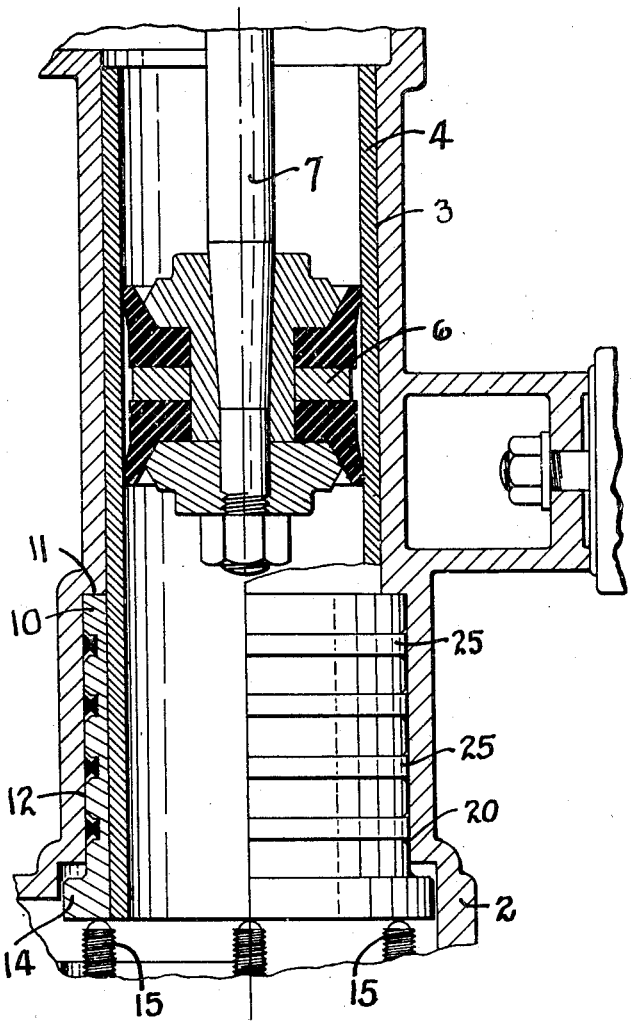
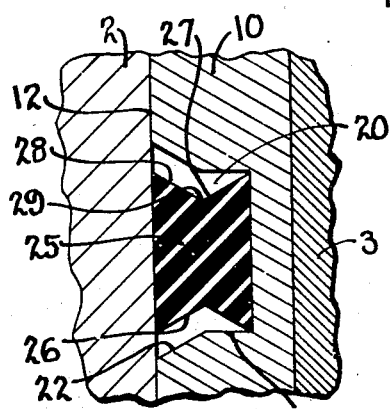
Fig 1
Fig 2
ED. H. ROBERTSON
*INVENTOR.*
BY Lester B. Clark
+ Ray L. Smith
*ATTORNEYS*

PACKING FOR JOINTS

Edward H. Robertson, Houston, Tex., assignor to Houston Oil Field Material Company, Houston, Tex.

Application November 3, 1945, Serial No. 626,536

7 Claims. (Cl. 309—3)

1

The invention relates to a liner for pumps and particularly to slush pumps which are used in circulating drilling mud in the rotary method of drilling wells.

Pump liners are usually subjected to considerable wear on the one hand and must resist the high pressure of pumping action on the other hand. One of the difficulties of maintaining slush pump liners in position against leakage is the provision of sealing the liner with the pump body.

It is therefore one of the objects of the present invention to provide a seal for the area between the slush pump liner and the pump body.

Another object of the invention is to provide a series of lip type packings between a slush pump liner and a slush pump body.

Still another object of the invention is to provide a double lip type packing which will resist the flow of fluid under pressure in either direction.

Still another object of the invention is to provide a double lip packing for slush pump liners which may flow under pressure from either direction to prevent leakage thereby.

Other and further objects of the invention will be readily apparent when the following description is considered in connection with the accompanying drawings, wherein:

Fig. 1. is a longitudinal sectional view through a slush pump and liner assembly and illustrating an arrangement of the packing.

Fig. 2 is an enlarged sectional view showing one of the packings in detail.

In Fig. 1 the pump body is illustrated generally at 2 and this body has a circular opening 3 therethrough which is arranged to receive the pump liner 4. This liner is usually in the form of a cylinder sleeve or tube which fits snugly in the opening 3. The piston 6 is arranged for reciprocation in the liner by the piston rod 7 and inasmuch as this is a double acting piston, there will be a tendency of the liquid on the high pressure side of the piston to leak along the outside of the pump liner 4 toward the opposite end. If such leakage occurs under high pressure, the abrasive materials in the drilling muds soon cut away the metal of the pump body and leakage results.

The present invention therefore contemplates that the tubular sleeve or liner 4 will be provided with an enlarged bushing 10 which is arranged to abut a shoulder 11 in the opening 3 of the pump body. This bushing 10 may be affixed to the periphery of the liner in any desired manner as shrinking or welding or in some instances such bushing or enlargement 10 may be forged or otherwise formed integral with the liner 4. In any event, it is desired to form a seal between the periphery of the enlargement 10 and the periphery 12 of the pump body opening 3 where it is enlarged to receive the enlargement 10.

The enlargement of the liner is provided with a flange 14 against which the set screws or bolts 15 are arranged to abut in holding the liner against movement.

The enlargement 10 is shown as being magnified in Fig. 2 and as having been formed with a recess 20. This recess has a straight wall 21 which is outwardly beveled at 22 so as to form a flaring recess.

Disposed in this recess 20 is a double lip type packing 25. This packing if formed as an annular ring whose end faces are dished at 26 to provide the beveled faces 27 and 28 which meet at an apex 29 at substantially the middle of the ring.

The lips of this sealing ring 25 are of the same width as the base of the recess 20 and is of a material which will flow when subjected to pressure. In this manner, if the pressure or fluid tends to leak along between the enlargement 10 and the body of the pump at 12, it will cause the lip type packing to flow with it and move over against the edges 21 and 22 on the far side of the recess 20. The distortion and displacement of this sealing material causes the face 27 to move against the straight wall 21 and the face 28 to move against the outward bevel portion 22 while the base of the ring will seal with the base of the recess. The outer periphery of the ring will seal with the surface of the opening 12 and prevent leakage between the parts. In this manner a seal is assured and in view of the fact that a double lip type of packing has been provided, leakage will be prevented in either direction past such a packing because the ring can move in either direction and flow to the downstream side of the recess and be pressed against the walls of the recess and the pump opening 12.

Because of the high pressures utilized in the pumping operation, Fig. 1 shows four of such packings which may be used in series. Of course any desired number may be utilized but it has been found that this number results in a satisfactory seal which prevents leakage along the outside of the liner.

What is claimed is:

1. A slush pump liner comprising a cylindrical body, an enlargement thereon having a shoulder to position the liner in the pump opening, a plurality of annular recesses in spaced relation along said enlargement, each recess having beveled portion on the end wall, and a double lip type packing in each recess so as to provide a seal along the periphery of the liner enlargement.

2. A slush pump liner comprising a cylindrical body, an enlargement thereon having a shoulder to position the liner in the pump opening, a plurality of annular recesses in spaced relation along said enlargement, each recess having beveled portion on the end wall, and a double lip type packing in each recess so as to provide a seal along the periphery of the liner enlargement, said packing having a base of the same width as the width of the recess.

3. A slush pump liner comprising a cylindrical body, an enlargement thereon having a shoulder to position the liner in the pump opening, a plurality of annular recesses in spaced relation along said enlargement, each recess having beveled portion on the end wall, and a double lip type packing in each recess so as to provide a seal along the periphery of the liner enlargement, the bevel of said walls being an outward bevel so that the outer end of said packing may move with the pressure thereon to fit the bevel of the end wall of the recess.

4. A sealing construction for slush pump liners comprising an annular groove in the periphery of the liner, said groove having a flat base, a straight side wall portion, and an outer side wall portion which is outwardly beveled, and a double beveled lip type packing ring in said groove.

5. A sealing construction for slush pump liners comprising an annular groove in the periphery of the liner, said groove having a flat base, a straight side wall portion, and an outer side wall portion which is outwardly beveled, and a double beveled lip type of packing ring in said groove, said groove at its base being the same width as the lip of said ring with the bevels providing a wider mouth for the recess so that the ring may flow with the pressure to flex and seal against the downstream beveled face.

6. A joint packing comprising cylindrical body, a plurality of spaced grooves therein, each groove having a side face made up of a double bevel, an annular packing in each groove, each packing having a double bevel end surface where the bevels are of a different inclination than the bevels of the groove so that pressure distortion of the packing will effect a seal.

7. In a slush pump having a liner opening, a liner therein and an annular recess in the periphery of said liner, the improvement comprising said recess having a flat annular base, a straight side wall portion, an upwardly beveled portion therebeyond, and a packing ring of resilient material in said recess, said ring having a flat inner periphery of a width to fit on the recessed base, a flat outer periphery to fit the inner opening, and double lip end walls so that when pressure is applied from one end said ring may flex to fit the downstream straight and beveled walls while engaging said base and opening surfaces.

EDWARD H. ROBERTSON.

REFERENCES CITED

The following references are of record in the file of this patent:

UNITED STATES PATENTS

| Number | Name | Date |
|---|---|---|
| 1,010,236 | Cochran | Nov. 28, 1911 |
| 1,035,279 | Walker | Aug. 13, 1912 |
| 1,309,103 | Rowledge | July 8, 1919 |
| 1,860,274 | Birkigt | May 24, 1932 |
| 2,108,392 | Sanders | Feb. 15, 1938 |
| 2,155,180 | Caldwell | Apr. 18, 1939 |
| 2,165,052 | Hering | July 4, 1939 |
| 2,170,443 | Barbarou | Aug. 22, 1939 |
| 2,427,789 | Kehle | Sept. 23, 1947 |

FOREIGN PATENTS

| Number | Country | Date |
|---|---|---|
| 126,330 | Great Britain | 1919 |
| 379,968 | Great Britain | 1932 |